United States Patent [19]

Sekiya et al.

[11] Patent Number: 4,671,995
[45] Date of Patent: Jun. 9, 1987

[54] MAGNETIC RECORDING MEDIUM COMPRISING AN UNDERCOATING MADE OF A MIXTURE OF THERMOSETTING POLYURETHANE AND POLYESTER RESINS

[75] Inventors: Satoshi Sekiya; Ikuo Matsumoto; Kuniharu Fujiki, all of Mito, Japan

[73] Assignee: Victor Company of Japan, Ltd., Japan

[21] Appl. No.: 700,661

[22] Filed: Feb. 11, 1985

[30] Foreign Application Priority Data

Feb. 13, 1984 [JP] Japan .................. 59-22822

[51] Int. Cl.$^4$ .................................. G11B 5/702
[52] U.S. Cl. ..................... 428/336; 360/135; 427/131; 428/482; 428/694; 428/900; 428/425.9
[58] Field of Search ............... 360/135; 428/694, 695, 428/425.9, 900, 482, 480, 336; 427/131; 252/62.54

[56] References Cited

U.S. PATENT DOCUMENTS

| | | | |
|---|---|---|---|
| 3,959,553 | 5/1976 | Hartmann | 427/131 |
| 4,089,993 | 5/1978 | Shirahata | 427/131 |
| 4,183,976 | 1/1980 | Yamada | 427/130 |
| 4,224,381 | 9/1980 | Patel et al. | |
| 4,275,113 | 6/1981 | Saito | 427/131 |
| 4,308,311 | 12/1981 | Ogawa | 428/694 |
| 4,419,406 | 12/1983 | Isobe et al. | |
| 4,487,802 | 12/1984 | Miyoshi | 360/135 |
| 4,504,542 | 3/1985 | Miyoshi | 428/694 |
| 4,528,240 | 7/1985 | Miyoshi | 428/694 |
| 4,540,618 | 9/1985 | Suzuki | 428/694 |
| 4,596,747 | 6/1986 | Nishimatsu | 428/694 |

FOREIGN PATENT DOCUMENTS

| | | | |
|---|---|---|---|
| 738347 | 7/1966 | Canada | 427/131 |
| 2016422 | 10/1970 | Fed. Rep. of Germany . | |
| 2260043 | 4/1974 | Fed. Rep. of Germany . | |
| 3213055 | 11/1982 | Fed. Rep. of Germany . | |
| 3415836 | 10/1984 | Fed. Rep. of Germany . | |
| 0014020 | 5/1970 | Japan | 427/131 |
| 0022071 | 6/1972 | Japan | 427/131 |
| 0047901 | 1/1979 | Japan | 427/131 |
| 0094521 | 7/1981 | Japan | 428/694 |
| 0165928 | 12/1981 | Japan | 360/135 |
| 0048502 | 2/1985 | Japan | 360/135 |
| 0043220 | 3/1985 | Japan | 428/694 |
| 836202 | 6/1960 | United Kingdom | 427/131 |
| 1004051 | 9/1965 | United Kingdom | 427/131 |
| 1376260 | 12/1974 | United Kingdom . | |
| 271053 | 12/1970 | U.S.S.R. | 427/131 |
| 539325 | 11/1975 | U.S.S.R. | 427/131 |

*Primary Examiner*—Ellis P. Robinson
*Attorney, Agent, or Firm*—Lowe, Price, LeBlanc, Becker & Shur

[57] ABSTRACT

A magnetic recording medium which comprises a nonmagnetic support, and a magnetic layer formed on the support through an undercoat layer is described. The undercoat layer is made of a cured product of a mixture of a thermosetting polyurethane resin and a thermosetting polyester used in an amount of not greater than 10 wt % of the polyurethane resin. The undercoat layer further comprises a phosphate ester.

7 Claims, No Drawings

MAGNETIC RECORDING MEDIUM COMPRISING AN UNDERCOATING MADE OF A MIXTURE OF THERMOSETTING POLYURETHANE AND POLYESTER RESINS

BACKGROUND OF THE INVENTION

1. Field of the Invention

This invention relates to magnetic recording media such as, for example, magnetic tapes, magnetic discs, and the like.

2. Description of the Prior Art

As is well known in the art, ordinary magnetic recording media such as magnetic tapes are made of a non-magnetic support and a magnetic layer formed on the support by applying and curing a magnetic paint comprising magnetic powders and binders.

Because of the recent tendency toward high density recording and the severe application conditions in recording and reproducing apparatus, magnetic recording media of the known type in which a magnetic layer is merely formed on a non-magnetic support are not considered to be satisfactory. Accordingly, there has been proposed another type of magnetic recording medium in which an undercoat layer is first formed on a non-magnetic support, on which a magnetic layer is then formed. This type of medium has the following advantages: high loadings of magnetic powders in the magnetic layer become possible; and the magnetic layer has high durability because of the formation of the undercoat layer.

The undercoat layer is formed, for example, of synthetic resins such as polyesters, polyurethanes, epoxy resins, phenolic resins, and the like.

However, we have found that the known undercoat layer has the following disadvantages. If an undercoat layer of a resin used is soluble in magnetic paints used to form a magnetic layer, the undercoat layer cannot be formed as a thin layer. This is because when the undercoat layer is too thin, say, below 1 μm, it is readily dissolved in the magnetic paint and thus does not show any effects of improving the adhesion to the magnetic layer. On the contrary, when the thickness of the undercoat layer is too large, the resulting magnetic medium becomes so large in total thickness that it is inconvenient to use such medium in existing recording and reproducing apparatus. To avoid this, the magnetic layer must have a smaller thickness than in ordinary cases. We have also found that even though the undercoat layer is not completely dissolved out by application of a magnetic paint, the surface properties of the magnetic layer are impeded by the partial dissolution of the undercoat layer.

On the other hand, when the undercoat layer is insoluble in a magnetic paint, it is disadvantageous in that the magnetic layer formed by applying and curing the paint on the undercoat layer has low adhesion to the the undercoat layer. It will thus be meaningless to provide the undercoat layer.

We have found that if an undercoat layer is not too readily soluble, nor completely insoluble in solvents for magnetic paints, i.e. the undercoat layer has a slight degree of solubility or is rather sparingly soluble in such solvents, the prior art disadvantages can be appropriately overcome.

SUMMARY OF THE INVENTION

It is accordingly an object of the present invention to provide magnetic recording media which comprise an undercoat layer of a mixture of polyurethane and polyester resins, both thermosetting in nature, whereby the peeling strength between a magnetic layer and the undercoat layer is very high.

It is another object of the invention to provide magnetic recording media which comprise an improved undercoat layer whereby the content of a binder in the magnetic layer can be relatively reduced, with an increasing content of magnetic powder, so that magnetic characteristics can be much improved.

It is a further object of the invention to provide magnetic recording media using an undercoat layer of thermosetting polyurethane and polyester resins, so that the surface electric resistance of the magnetic layer becomes small by the influence of the undercoat layer.

It is a still further object of the invention to provide magnetic recording media which make use of an undercoat layer containing a phosphate ester antistatic agent whereby the surface electric resistance can be reduced to a substantial extent.

According to the invention, there is provided a magnetic recording medium of the type which comprises a non-magnetic support, and a magnetic layer formed on the support through an undercoat layer. The present is characterized in that the undercoat layer is made of a cured mixture of a thermosetting polyurethane resin and a thermosetting polyester resin used in an amount of not greater than 10 wt% of the polyurethane resin. The undercoat layer is generally formed in a dry thickness of from 0.1 to 0.5 μm.

DETAILED DESCRIPTION AND PREFERRED EMBODIMENTS OF THE INVENTION

As described above, the undercoat layer is formed of a cured product of a mixture of thermosetting polyurethane and polyester resins in a defined mixing ratio. The cured product is sparingly soluble in solvents ordinarily used in magnetic paints, e.g. toluene, methyl ethyl ketone, methyl isobutyl ketone and the like. The thermosetting polyurethane resins suitable for the purpose of the invention include reaction products of (A) polyols, (B) diols or glycols, and (C) diisocyanates. Examples of the polyols (A) include polyethylene adipate, polybutylene adipate, polyhexamethylene adipate, polycaprolactam, and the like. Examples of the diols (B) include ethylene glycol, butylene glycol, neopentyl glycol, diethylene glycol, and the like. Examples of the diisocyanates (C) include 4,4'-diphenylmethane diisocyanate (MDI), isophorone diisocyanate (IPDI), and the like. These three ingredients (A), (B), and (C) are interacted by any known procedures to obtain thermosetting polyurethane resins. In the practice of the invention, it is preferred that urethane bonds are contained in the polyurethane resin in a relatively large amount. In this sense, the polyurethane resin is prepared such that a molar ratio, ingredients [(A) + (B)]/ingredient (C) is in the range of from 0.6 to 1.4:1, preferably 0.9 to 1.1:1, and a molar ratio, (B)/(A), is in the range of 1 to 8:1, preferably 3 to 7:1. Preferable thermosetting polyurethane resins are reaction products of polybutylene adipate, butylene glycol, and 4,4'-diphenylmethanediisocyante (MDI). In general, the urethane bonds, —NHCOO—, in polyurethane resins strongly cohere to one another through hydrogen bonds. In order to break the cohesion, solvents having high dissolving power such as, for example, cyclohexanone, tetrahydrofuran and the like are necessary. Organic solvents ordinarily used in magnetic paints, e.g. toluene, methyl ethyl ketone, methyl isobutyl ketone and the like, are not able to dissolve the polyurethane resins of the type mentioned above. Especially, when the polyurethane resin has been once cured, it will be more difficult to dissolve.

The polyurethane resins suitable in the practice of the invention are preferred to have a softening point over 80° C. and molecular weight of from 10,000 to 100,000. These polyurethane resins are commercially available, for example, from Nippon Polyurethane Co., Ltd. under the names of P-22S and P-26S.

In order to ensure good adhesion to a support, such as a resin film, and also to a magnetic layer, the thermosetting polyurethane resin is mixed with a thermosetting polyester resin in an amount of not greater than 10 wt % of the polyurethane resin. This is because polyester resins are soluble in such solvents as used in ordinary magnetic paints, so that the adhesion to the magnetic layer and film support is much more improved over the case where thermosetting polyurethane resins alone are used. Examples of the thermosetting polyester resins are polyethylene terephthalate, polyneopentyl isophthalate, polyethylene adipate, and the like.

The undercoat layer is formed on a support as follows. Predetermined amounts of thermosetting polyurethane and polyester resins are dissolved in a mixed solvent at a concentration of not greater than approximately 5 wt % in total of the resins. The mixed solvent is, for example, a combination of solvents having high dissolving power such as tetrahydrofuran and cyclohexanone, and solvents having relatively weak dissolving power such as aromatic hydrocarbons, e.g. toluene, xylene and the like, ketones such as methyl ethyl ketone, methyl isobutyl ketone and the like. The undercoating solution is applied onto a non-magnetic support in a dry thickness of from about 0.1 to 0.5 μm, preferably from 0.1 to 0.3 μm, and cured at temperatures of from 40° C. to 80° C. for 5 to 30 hours. The undercoat layer of the cured product of polyurethane and polyester resins is conviently unlikely to suffer blocking as would be experienced upon curing.

In a preferred embodiment, the undercoat layer may further comprise an antistatic agent, so that the surface electric resistance of the magnetic recording media can be reduced to a substantial extent and the runnability of the media can be improved. Especially, when phosphate esters are used as the antistatic agent, the bonding force between the undercoat layer and the magnetic layer rarely lowers. Phosphate esters are effective when used in amounts of from 2 to 20 parts by weight per 100 parts by weight of the total resin composition.

Specific examples of the phosphate ester include:

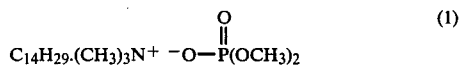
(1)

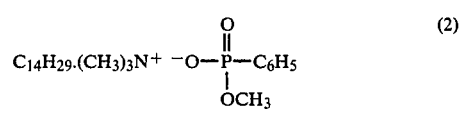
(2)

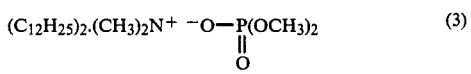
(3)

The magnetic layer may be formed on the undercoat layer by any known procedures using ordinary magnetic paint compositions. The magnetic paint composition comprises a magnetic powder and a binder therefor in a solvent. Examples of the magnetic powder may be made of any known metals such as Fe, Co, Ni and the like and alloys thereof, and metal oxides such as gamma-$Fe_2O_3$, $Fe_3O_4$ and the like.

The binders for the magnetic powder may also be any known thermoplastic resins, thermosetting resins, and mixtures thereof. Typical examples of the binders include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacylic ester-vinylidene chloride copolymers, urethane elastomers, cellulose derivatives, vinyl chloride-vinyl acetate-vinyl alcohol copolymers, various other synthetic rubbers, phenolic resins, epoxy resins, alkyd resins, silicone resins, urea-formaldehyde resins, mixtures of isocyanates and polyols, and the like. Solvents for these binder resins are alcohols such as methanol, ethanol and the like, aromatic compounds such as xylene, toluene, benzene and the like, ketones such as acetone, methyl ethyl ketone, methyl isobutyl ketone, and the like. These solvents may be used singly or in combination. Needless to say, any other additives used for these purposes may also be used, including dispersants, lubricants, abrasive agents, surfactants, and the like.

Suitable supports include, for exampel, films, foils, and sheets of a variety of materials. Typical materials include synthetic or semi-synthetic resins such as polyesters, polyolefins, cellulose derivatives and the like, metals such as aluminum, copper and the like, and glasses and ceramics. Of these, synthetic resins including polyesters are preferred.

The present invention is more particularly described by way of examples.

EXAMPLE 1

95 parts by weight of thermosetting polyurethane, P-26S, 5 parts by weight of thermosetting polyester, Bylon 2000, and 20 parts by weight of an isocyanate curing agent were dissolved in a mixed solvent of 1500 parts by weight of cyclohexanone and 1500 parts by weight of methyl ethyl ketone. The resulting solution was applied, by means of a gravure coater, onto a 15 μm thick polyethylene terephthalate film in a dry thickness of 0.2 μm, followed by curing at 70° C. for 24 hours.

A magnetic paint was separately prepared by dispersing 100 parts by weight of Co-adsorbed gamma-$Fe_2O_3$, 30 parts by weight of vinyl chloride-vinyl acetate resin, and 4 parts by weight of carbon black powder in a mixed solvent of 100 parts by weight of toluene and 100 parts by weight of methyl ethyl ketone, and mixing in a sand mill for 10 hours. The thus prepared magnetic paint was applied onto the undercoat layer in a dry thickness of 5 μm, followed by drying, calendering, and slitting into pieces having a predetermined width, thereby obtaining magnetic video tapes.

EXAMPLE 2

The general procedure of Example 1 was repeated except that 10 parts by weight of the phosphate ester (1) indicated before was used in the undercoating solution, thereby obtaining magnetic tapes.

COMPARATIVE EXAMPLES 1

The general procedure of Example 1 was repeated except that the undercoat layer was not formed, thereby obtaining magnetic tapes.

COMPARATIVE EXAMPLE 2

The procedure of Comparative Example 1 was repeated using, instead of the magnetic paint, a magnetic paint which was obtained by dispersing 100 parts by weight of Co-adsorbed gamma-$Fe_2O_3$, 40 parts by weight of vinyl chloride-vinyl acetate resin, and 7 parts by weight of carbon black powder in a mixed solvent of 100 parts by weight of toluene and 100 parts by weight of methyl ethyl ketone, and mixing a sand mill for 10 hours, thereby obtaining magnetic tapes. This magnetic paint had greater amounts of the binder and the antistatic carbon black powder than the magnetic paint used in Comparative Example 1.

The magnetic tapes obtained in the examples and comparative examples were subjected to measurements of a magnetic characteristic, i.e. maximum magnetic flux density, Bm, surface electric resistance, and film peeling strength.

The peeling strength was determined as follows: an adhesive tape was attached to the magnetic layer of each magnetic tape, and, while the base film was kept horizontal, was drawn up in the vertical direction at a rate of 1 cm/second to measure a force required for the peeling between the base film and the magnetic layer.

The surface electric resistance was measured as follows: two metallic electrodes, each in the form of a quadrant having a diameter of about 1 cm in section, were kept away from each other at a distance of 12.7 mm; each magnetic tape was placed on the electrodes at right angles so that the magnetic layer contacted the electrodes; a weight of 160 g was suspended from each side of the magnetic tape; and a DC voltage of 500 plus and minus 50 V was applied to the tape by the use of an insulation resistance tester.

The results are shown in Table below.

| | Surface Electric Resistance | | | Magnetic | |
|---|---|---|---|---|---|
| | Magnetic Layer | Undercoat Layer | Base Film | Characteristic, Bm (G) | Peeling Strength (g) |
| | | (ohms/square) | | | |
| Example 1 | $1.5 \times 10^9$ | $1.6 \times 10^{11}$ | $3.2 \times 10^{11}$ | 1400 | 285 |
| Example 2 | $4.0 \times 10^8$ | $6.9 \times 10^9$ | $3.2 \times 10^{11}$ | 1405 | 280 |
| Com. Ex. 1 | $2.2 \times 10^9$ | — | $3.2 \times 10^{11}$ | 1400 | 60 |
| Com. Ex. 2 | $3.9 \times 10^8$ | — | $3.2 \times 10^{11}$ | 1080 | 80 |

As will be seen from the above results, the peeling strength of the tapes of the invention is much higher than the peeling strength of the tapes of the comparative examples.

What is claimed is:

1. In a magnetic recording medium which comprises a non-magnetic support, an undercoat layer formed on the non-magnetic support and made of a cured product of a mixture of a thermosetting polyurethane resin and a thermosetting polyester resin, and a magnetic layer formed on said undercoat layer by application of a magnetic paint onto said undercoat layer, the improvement characterized in that said mixture contains the thermosetting polyester resin in an amount not greater than 10 wt % of the polyurethane resin, said magnetic paint comprises a solvent capable of dissolving the thermosetting polyester resin but incapable of dissolving the polyurethane resin when applied to the undercoat layer, and said undercoat layer further comprises a phosphate ester anistatic agent in an amount of from 2 to 20 parts by weight per 100 parts by weight of the total thermosetting resins.

2. The magnetic recording medium according to claim 1, wherein the undercoat layer has a thickness of from 0.1 to 0.5 μm.

3. The magnetic recording medium according to claim 1, wherein said thermosetting polyurethane resin is a reaction product of (A) a polyol selected from the group consisting of polyethylene adipate, polybutylene adipate, polyhexamethylene adipate and polycaprolactam, (B) a glycol selected from the group consisting of ethylene glycol, butylene glycol, neopentyl glycol and diethylene glycol, and (C) a diisocyanate selected from the group consisting of 4,4'-diphenylmethane diisocyanate and isophorone diisocyanate.

4. The magnetic recording medium according to claim 3, wherein said polyurethane resin is a reaction product of polybutylene adipate, butylene glycol, and 4,4'-diphenylmethane diisocyanate.

5. The magnetic recording medium according to claim 1, wherein said polyurethane resin has a molecular weight of from 10,000 to 1000,000.

6. The magnetic recording medium according to claim 1, wherein said thermosetting polyester is selected from the group consisting of polyethylene terephthalate, polyneopentyl isophthalate, and polyethylene adipate.

7. The magnetic recording medium according to claim 1, wherein said phosphate ester is a member selected from the group consisting of

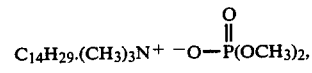

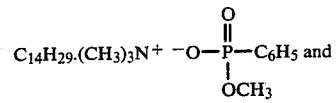

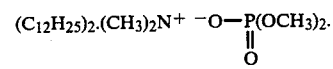

* * * * *